No. 878,285. PATENTED FEB. 4, 1908.
F. W. HEIMBURGER.
POTATO HARVESTER.
APPLICATION FILED FEB. 2, 1907.
2 SHEETS—SHEET 2.
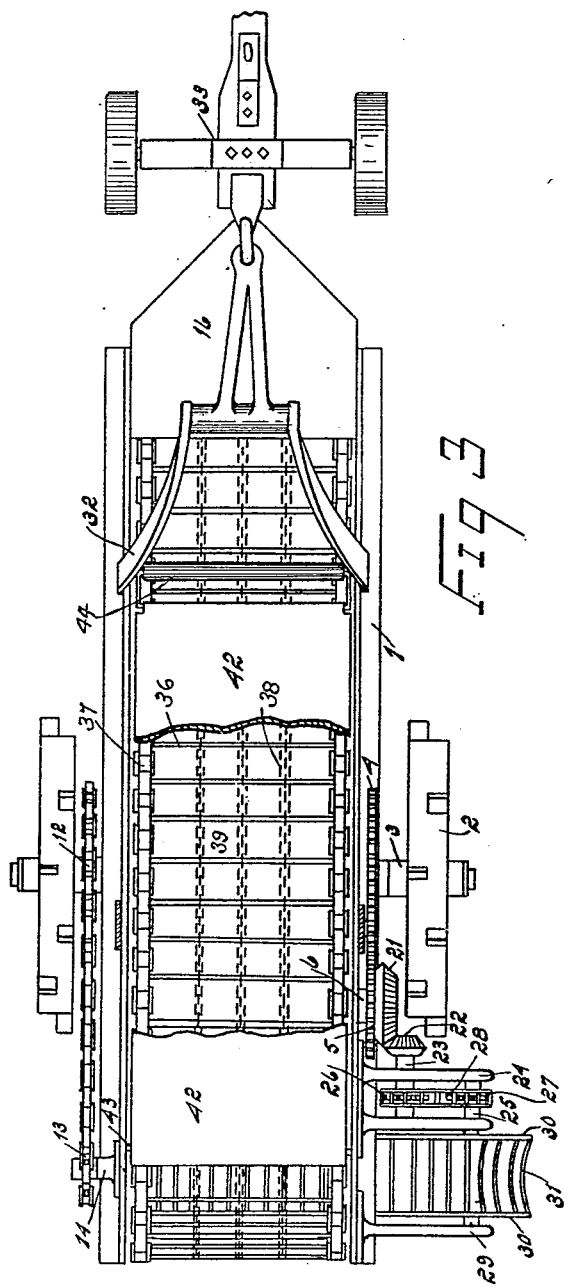
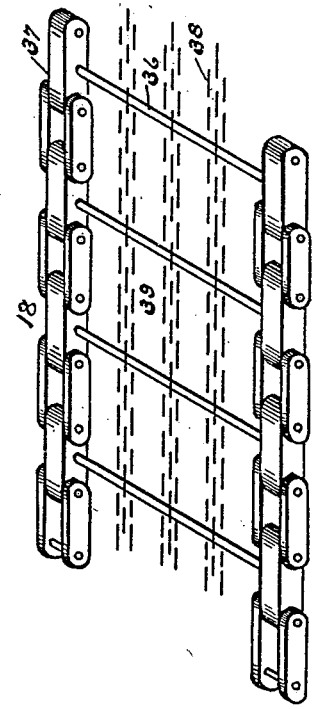
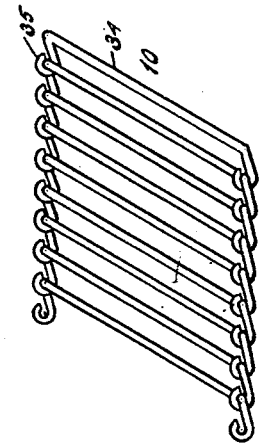
WITNESSES
INVENTOR,
Frederick W. Heimburger
BY
Bates, Fouts & Hull
ATTORNEYS

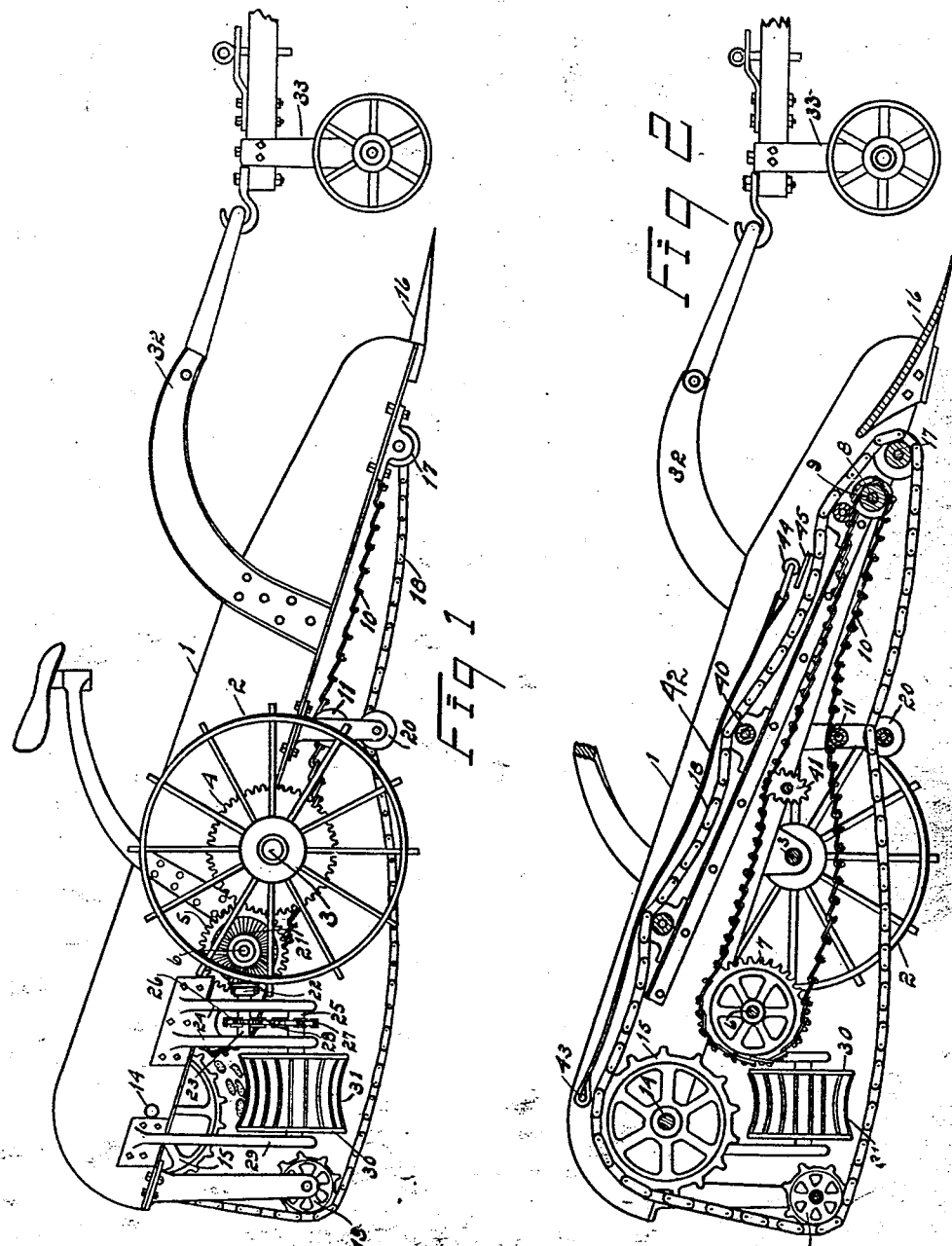

UNITED STATES PATENT OFFICE.

FREDERICK W. HEIMBURGER, OF HURON, OHIO.

POTATO-HARVESTER.

No. 878,285.

Specification of Letters Patent.

Patented Feb. 4, 1908.

Application filed February 2, 1907. Serial No. 355,431.

*To all whom it may concern:*

Be it known that I, FREDERICK W. HEIMBURGER, residing at Huron, in the county of Cuyahoga and State of Ohio, have invented a certain new and useful Improvement in Potato-Harvesters, of which the following is a full, clear, and exact description, reference being had to the accompanying drawings.

My invention relates to potato harvesters of the type wherein combined screens and carriers are used in conjunction with digging apparatus for elevating the potatoes and separating the same from the dirt, tops, weeds and other refuse matter.

The object of the invention is to provide a harvester of this type wherein the above results may be accomplished in an effective manner and wherein means is provided for positively separating from the tops or vines any potatoes that may adhere thereto.

Generally speaking, the invention may be defined as consisting of the combinations of elements embodied in the claims hereto annexed.

In the drawings forming a part hereof, Figure 1 represents a side elevation of a harvester constructed in accordance with my invention; Fig. 2 represents a longitudinal sectional view of the harvester shown in Fig. 1; Fig. 3 represents a top plan view of such harvester; and Figs. 4 and 5 represent perspective details of the combined screens and carriers which I employ for elevating the potatoes and simultaneously separating therefrom the dirt, vines, and other refuse matter.

The harvester comprises a main frame 1 mounted on suitable drive wheels 2, said drive wheels being connected by a shaft 3 suitably supported in the frame. On shaft 3 there is rigidly mounted, adjacent one of the drive wheels and outside of the main frame, a spur wheel 4 meshing with a similar spur wheel 5 mounted on a shaft 6. Rigid with said shaft 6 and adjacent each end thereof is a sprocket gear 7. 8 denotes a shaft extending across the front portion of frame 1 and having mounted thereon and adjacent each end thereof a roller 9.

Sprocket wheel 7 and roller 9 are for the purpose of driving the combined carrier and screen 10. The frame is provided, at opposite sides thereof, with rollers 11 over which the lower portion of carrier 10 travels for the purpose of preventing undue sagging thereof.

Shaft 3 is also provided at any suitable point adjacent to an end thereof with a sprocket wheel 12 adapted to drive a sprocket wheel 13 on shaft 14, which is to the rear of shaft 6 and above the latter shaft. The size of the gears 4 and 5 and 12 and 13 is such as to cause shaft 6 to be driven at a greater rate of speed than shaft 3 and shaft 14 to be driven at a greater rate of speed than shaft 6.

Adjacent each end of shaft 14 there is provided a sprocket wheel 15, and at each side of the front of the frame and immediately adjacent to the rear end of the scoop or plow 16 is mounted a roller 17, around which extends the front end of the combined carrier and screen 18. Below and to the rear of sprocket wheels 15 is mounted a pair of idlers 19, for a purpose to be hereinafter described; and mounted on opposite sides of the frame and about midway of the length thereof is a pair of rollers 20, the latter rollers being for the purpose of preventing the lower portion of carrier 18 from unduly sagging.

Shaft 6 is also provided with a bevel gear 21 thereon and rigid therewith, said gear meshing with a bevel gear 22 on a shaft 23. Shaft 23 is suitably supported, as between hangers 24. Between the lower ends of hangers 24 is mounted a shaft 25. By means of a sprocket 26 on shaft 23 and a sprocket 27 on shaft 25 and a chain 28, the motion of shaft 23 is transmitted to shaft 25. Shaft 25 is extended rearwardly and has its rear end supported by hanger 29. The portion of shaft 25 between rear hanger 24 and hanger 29 is provided with a pair of sprocket wheels 30 by means of which and a suitable pair of rollers at the opposite side of the frame a carrier or conveyer 31 is driven. It will be observed that the transverse carrier 31 is arranged immediately at the rear of carrier 10 in the base of the triangle formed by roller 17, sprockets 15 and idlers 19, in such position as to receive any articles delivered from the rear of the latter carrier.

32 denotes draw bars which are connected to opposite sides of the frame of the apparatus, the front ends of said draw bars being connected to a suitable truck 33.

The carriers 10 and 18 are represented in Figs. 4 and 5. As will appear from Fig. 4, carrier 10 is preferably formed of a series of heavy wire loops 34, each of said loops being substantially U-shaped with the ends of the parallel members bent back upon themselves to form hooks 35, said hooks engaging the opposite corners of the next adjacent loop. The distance between gears 7 is such that the teeth of each gear engage the cross wire of each loop 34 adjacent to the corners thereof and the teeth of such sprockets are spaced to correspond to the distance between said cross bars.

The carrier 18 is preferably constructed as shown in Fig. 5 and comprises a series of cross wires or bars 36 having their opposite ends connected to links 37 of the drive chain, said links being adapted to be engaged by the teeth of the sprocket wheels 15. Cross wires or rods 36 are spaced apart a greater distance than are the cross wires 34 of conveyer 10 and are provided with longitudinally extending chains 38 which are connected with said cross wires or rods 36 to form therewith coarse meshes 39.

The frame is provided at opposite sides thereof with rollers 40 over which links 37 pass to prevent undue sagging of the carrier 18. As the rear or delivery end of carrier 18 is located beyond the rear side of transverse carrier 31, the idlers 19 are provided and are so located as to carry the lower rear portion of carrier 18 to the rear of and below the transverse carrier 31. As will appear from Figs. 1 and 2, carrier 31 is preferably constructed in the same manner as carrier 10, but, being of less width than carriers 10 and 18, the cross wires thereof are concaved in order to retain the potatoes thereon. By means of carrier 31, the potatoes are conveyed to the side of the apparatus and may be delivered into any suitable receptacle located adjacent to the discharge end thereof.

In operation, the plow or scoop 16 unearths the potatoes, and the potatoes, together with the vines, clods, weeds, etc., are delivered onto the carrier 18. As the potatoes and refuse matter are elevated by carrier 18, the vines and other material which are too coarse to pass through the meshes of said carrier are retained on carrier 18 and the potatoes and finer material drop onto carrier 10. As one of the carriers (as carrier 18) travels at a faster rate of speed than the other, any potatoes which may drop through the meshes of the former carrier and still adhere to their vines will be detached from the vines by the relative movement of the two carriers. The vines and other refuse matters retained by carrier 18 are discharged at the rear of the apparatus. Meanwhile, the potatoes, with such dirt, clods, etc. as may be deposited on carrier 10, are elevated thereby. By means of the cam wheels 41 located at opposite sides of the frame, the carrier 10 is shaken and the dirt and other refuse matter are separated thereby from the potatoes, which are delivered free from foreign matter, from the rear end of said carrier 10 onto the transverse carrier 31. It will be noted that the front or lower ends of carriers 10 and 18 are in close proximity and the distance between such carriers increases toward the rear of the machine. This arrangement of the carriers, coupled with the fact that they are driven at different rates of speed, assists greatly in the separation of the potatoes from the clods of earth which are thrown upon the upper carrier by the plow or scoop. The potatoes and clods will drop through meshes of the upper carrier onto the closely spaced cross wires of the carrier 10 and, at the contiguous portions of said carriers, the potatoes and the larger clods will occupy the space between the carriers, resting on top of the carrier 10 and extending into the meshes of carrier 18. The result will be that, for a certain distance of their travel, the clods will be ground to pieces by the relative movement between the carriers while the potatoes, owing to their generally rounded shape, will turn or rotate by this relative movement and will not be injured. By the time that sufficient space is provided between the carriers for the reception therebetween of the clods and potatoes, the former will have been materially reduced by the action just described and, by the time the potatoes are conveyed to the upper or discharge end of carrier 10 they will be free from clods.

In order to prevent any vines from being drawn through the meshes of the upper carrier by reason of the drag produced thereon by the potatoes engaging the lower carrier and the difference in the rates of travel of said carriers, I have provided means for holding the vines in contact with the upper carrier. This means preferably consists of an apron 42, which may be made of sheet iron and having the rear end thereof pivotally fastened to the opposite sides of the frame, as at 43, and the lower end thereof provided with a roller 44. To space the roller a sufficient distance from the upper carrier to permit the material carried thereby to pass beneath the apron, the roller is supported above the upper surface of said carrier as by means of flanges or ribs 45 projecting inwardly from opposite sides of the frame and adapted to support the ends of the roller. The material which is discharged from the plow or scoop upon the front end of the carrier 18 is in such quantity that there will be no danger of the complete separation of the dirt, etc., from the weeds and vines until the material has been carried a considerable distance by the carrier 18. For this reason, the lower end of the apron and the roller theron are located about one fourth of the distance from the front of the carrier to the rear thereof. As the material engages the roller, the latter is free to move in a vertical direction and the vines, etc. pass under the roller and under the apron 42. By the time the potatoes are free to drop through the meshes of carrier 18 onto the upper surface of carrier 10, the apron will retain the vines in a flattened condition and will prevent them from being drawn through the meshes by the drag or pull (which will be exerted upon any potatoes adhering to the vines) by the differences in the rates of speed of the carriers.

By the construction hereinbefore described, I provide a particularly compact and efficient form of potato harvester. The carrier for the vines, weeds, etc., surrounds the two carriers for potatoes, enabling the latter carriers to operate without interference by the former carrier. The potatoes are effectively separated from the weeds, vines, etc., this action being furthered by the relative movement between carriers 10 and 18, whereby any potatoes that may drop through the meshes of carrier 18 and be clinging to the vines will be detached therefrom.

I claim:

1. In a potato harvester, the combination of a frame, a plow or scoop, an endless carrier triangular in outline and having its apex adjacent to the plow or scoop, a second endless carrier within the former carrier and extending in the same general direction, with its delivery end spaced from the base portion of the former carrier, a transverse endless carrier located within the base portion of the former carrier with its upper surface in position to receive the material delivered from the second carriers, and means for driving said carriers, substantially as specified.

2. In a potato harvester, the combination of a frame having at the forward end thereof a plow or scoop, an endless carrier having the front end thereof located adjacent to said plow or scoop in position to receive the materials discharged therefrom, a second carrier within the first-mentioned carrier and having its upper surface spaced therefrom, means for driving said carriers at different rates of speed, and means for shaking the upper portion of the second carrier, substantially as specified.

3. In a potato harvester, the combination of a frame having at the forward end thereof a plow or scoop, an endless carrier having the front end thereof located adjacent to said plow or scoop in position to receive the material discharged therefrom, a second carrier within the first-mentioned carrier and having its upper surface spaced therefrom, said second carrier having finer meshes than the first-mentioned carrier, means for driving said carriers at different rates of speed, and means for shaking the upper portion of the second carrier.

4. In a potato harvester, the combination of a plow or scoop, a carrier having its forward end adjacent to the plow or scoop to receive materials discharged therefrom, an apron supported above said carrier and in close proximity thereto, a second carrier below the first-mentioned carrier, and means for driving said carriers at different rates of speed, substantially as specified.

5. In a potato harvester, the combination of a plow or scoop, a carrier having the forward end thereof adjacent to the plow or scoop to receive the materials discharged therefrom, and a flexible apron above said carrier, substantially as specified.

6. In a potato harvester, the combination of a plow or scoop, a carrier having the forward end thereof adjacent to the plow or scoop to receive material discharged therefrom, and an apron above said carrier, said apron being provided at its lower end with a roller and having its rear end pivotally supported above said carrier, substantially as specified.

7. In a potato harvester, the combination of a frame, a plow or scoop at the forward end of said frame, a carrier within said frame and having its forward end adjacent to the plow or scoop to receive materials discharged therefrom, an apron above said carrier, said apron having a roller at the lower end thereof, means for supporting said roller adjacent to but spaced from the upper surface of the carrier, and means for pivotally supporting the rear end of said apron from the frame, substantially as specified.

8. In a potato harvester, the combination of a plow or scoop, a carrier having a portion thereof located adjacent to said plow or scoop to receive the materials discharged therefrom, a second carrier having its upper surface below the upper surface of the former carrier, means for driving said carriers at different rates of speed, and means for holding the vines on the upper carrier, substantially as specified.

9. In a potato harvester, the combination of a frame, a plow or scoop, an endless carrier triangular in outline and having its apex adjacent to the plow or scoop, a second endless carrier within the first carrier and extending in the same general direction, with its delivery end spaced from the base portion of the former carrier, a transverse endless carrier located within the base portion of the former carrier with its upper surface in position to receive the material delivered from the second carrier, drive wheels for said frame, a shaft therefor, and driving connections between said shaft and all of said carriers, substantially as specified.

10. In a potato harvester, the combination of a plow or scoop, an endless carrier having its front end adjacent to said plow or scoop, a second carrier within the first mentioned carrier and having the forward upper portion thereof in close proximity to the corresponding portion of the former carrier, the space between the upper portions of said carriers increasing from the front to the rear thereof, and means for driving said carriers at different rates of speed, substantially as specified.

11. In a potato harvester, the combination of a plow or scoop, an endless carrier having the front end thereof located adjacent to said plow or scoop in position to receive the materials discharged therefrom, a second carrier within the first mentioned carrier and having its upper surface spaced from the corresponding surface of the former carrier, and means for driving said carriers at different rates of speed.

12. In a potato harvester, the combination of a plow or scoop, an endless meshed carrier positioned to receive on its upper surface the materials discharged therefrom, a second meshed carrier having its upper surface below and spaced from the former carrier, the upper surfaces of said carriers being close together for a portion of their travel and relatively far apart for another portion of their travel, and means for driving said carriers at different rates of speed, substantially as specified.

In testimony whereof, I hereunto affix my signature in the presence of two witnesses.

FREDERICK W. HEIMBURGER.

Witnesses:
J. B. HULL,
CHAS. NEILL.